United States Patent
Wittenbrink et al.

(10) Patent No.: US 10,120,187 B2
(45) Date of Patent: Nov. 6, 2018

(54) SUB-FRAME SCANOUT FOR LATENCY REDUCTION IN VIRTUAL REALITY APPLICATIONS

(71) Applicant: NVIDIA Corporation, Santa Clara, CA (US)

(72) Inventors: Craig Michael Wittenbrink, Palo Alto, CA (US); Ziyad Sami Hakura, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 15/047,568

(22) Filed: Feb. 18, 2016

(65) Prior Publication Data
US 2017/0243319 A1    Aug. 24, 2017

(51) Int. Cl.
| | |
|---|---|
| G06T 1/20 | (2006.01) |
| G02B 27/01 | (2006.01) |
| G06F 3/14 | (2006.01) |
| G06F 3/01 | (2006.01) |
| G09G 5/00 | (2006.01) |
| G06F 9/451 | (2018.01) |
| G09G 3/00 | (2006.01) |
| G09G 5/18 | (2006.01) |
| G09G 5/36 | (2006.01) |

(52) U.S. Cl.
CPC .............. *G02B 27/01* (2013.01); *G06F 3/011* (2013.01); *G06F 3/14* (2013.01); *G06F 9/451* (2018.02); *G09G 5/00* (2013.01); *G09G 3/003* (2013.01); *G09G 5/18* (2013.01); *G09G 5/363* (2013.01); *G09G 2350/00* (2013.01); *G09G 2360/08* (2013.01)

(58) Field of Classification Search
CPC .... G06F 3/012; G06F 3/0346; G06F 3/04815; G06F 3/013; G06T 19/006; G06T 3/4038
See application file for complete search history.

(56) References Cited

U.S. PATENT DOCUMENTS

| | | | |
|---|---|---|---|
| 6,766,055 B2 * | 7/2004 | Matsugu | G06K 9/48 382/173 |
| 7,425,981 B2 * | 9/2008 | Kamariotis | H04N 19/503 348/14.13 |
| 8,749,564 B2 | 6/2014 | Hakura et al. | |

(Continued)

OTHER PUBLICATIONS

U.S. Appl. No. 14/726,381, filed May 29, 2015.

(Continued)

*Primary Examiner* — Jason Pringle-Parker
(74) *Attorney, Agent, or Firm* — Zilka-Kotab, P.C.

(57) ABSTRACT

A system, computer readable medium, and method for sub-frame scan-out are disclosed. The method includes the steps of dividing a frame into a plurality of slices. For each slice in the plurality of slices, the steps further include sampling a sensor associated with a head mounted display to generate sample data corresponding to the slice; adjusting one or more parameters associated with rendering operations for the slice based on the sample data; and rendering primitive data associated with a model according to the rendering operations to generate image data for the slice. Each slice is a portion of the frame and corresponds to different sample data from the sensor. Thus, adjusting of the parameters is different for each slice of the frame.

20 Claims, 15 Drawing Sheets

(56) References Cited

U.S. PATENT DOCUMENTS

| | | | |
|---|---|---|---|
| 8,941,676 B2 | 1/2015 | Hakura et al. | |
| 9,542,718 B2 * | 1/2017 | Thulasimani | G02B 27/017 |
| 2006/0217008 A1 * | 9/2006 | Higashino | A63F 13/10 |
| | | | 439/894 |
| 2010/0079356 A1 * | 4/2010 | Hoellwarth | G02B 27/017 |
| | | | 345/8 |
| 2012/0019670 A1 * | 1/2012 | Chang | H04N 9/3147 |
| | | | 348/189 |
| 2012/0154386 A1 * | 6/2012 | Nagara | G02B 27/26 |
| | | | 345/419 |
| 2012/0328196 A1 * | 12/2012 | Kasahara | G06T 15/20 |
| | | | 382/190 |
| 2014/0118348 A1 | 5/2014 | Hakura et al. | |
| 2014/0118361 A1 | 5/2014 | Hakura et al. | |
| 2014/0118363 A1 | 5/2014 | Hakura et al. | |
| 2014/0118364 A1 | 5/2014 | Hakura et al. | |
| 2014/0118365 A1 | 5/2014 | Hakura | |
| 2014/0118366 A1 | 5/2014 | Hakura et al. | |
| 2014/0118369 A1 | 5/2014 | Hakura et al. | |
| 2014/0118370 A1 | 5/2014 | Hakura et al. | |
| 2014/0118373 A1 | 5/2014 | Hakura et al. | |
| 2014/0118374 A1 | 5/2014 | Hakura et al. | |
| 2014/0118375 A1 | 5/2014 | Abdalla et al. | |
| 2014/0118376 A1 | 5/2014 | Hakura et al. | |
| 2014/0118379 A1 | 5/2014 | Hakura et al. | |
| 2014/0118380 A1 | 5/2014 | Hakura et al. | |
| 2014/0118393 A1 | 5/2014 | Hakura | |
| 2014/0122812 A1 | 5/2014 | Hakura et al. | |
| 2014/0316543 A1 * | 10/2014 | Sharma | H04L 67/10 |
| | | | 700/94 |
| 2015/0002542 A1 * | 1/2015 | Chan | G06F 3/048 |
| | | | 345/633 |
| 2015/0097845 A1 | 4/2015 | Hakura et al. | |
| 2015/0213638 A1 | 7/2015 | Dimitrov et al. | |
| 2015/0371417 A1 * | 12/2015 | Angelov | G06Q 10/101 |
| | | | 345/442 |

OTHER PUBLICATIONS

Regan, M. et al., "Priority rendering with a virtual reality address recalculation pipeline," Proceedings of the 21st annual conference on Computer graphics and interactive techniques, 1994, pp. 155-162.

* cited by examiner

US 10,120,187 B2

SUB-FRAME SCANOUT FOR LATENCY REDUCTION IN VIRTUAL REALITY APPLICATIONS

FIELD OF THE INVENTION

The present invention relates to graphics processing, and more particularly to image rendering for head mounted displays.

BACKGROUND

Processing graphics primitives to render images for display is computationally intensive. The latency associated with rendering a frame is a limiting requirement for many applications. For example, real-time image rendering systems may be required to render frames at a minimum of 30 frames per second (fps). When the scene being rendered becomes too complex, then the system may not be able to produce frames at the desired frame rate. Reducing the frame rate results in choppy video that does not appear to a viewer to be high quality. In computer gaming applications, where user input is used to render frames of video, long latency may result in a noticeable lag between a user providing feedback via an input device and the feedback causing a resulting action on the video. This lag is an undesirable trait that is easily noticed by those people playing the game.

Virtual reality systems place a new emphasis on rendering latency. Because the motion of a head mounted display is tracked and utilized to update the generated video, any latency in rendering results in a disconnect between what the user sees in response to the physical motion. When this rendering latency is high, the user may become nauseous due to the disconnect between the visual stimulus and the motion detected by the inner ear.

In order to reduce this effect, virtual reality systems may have higher refresh rates than typical displays. Typical refresh rates may be 60 Hz or higher. However, the rendering latency associated with generating the image frames for display may not enable frames to be generated as these high refresh rates. Thus, there is a need for addressing these issues and/or other issues associated with the prior art.

SUMMARY

A system, computer readable medium, and method for sub-frame scan-out are disclosed. The method includes the steps of dividing a frame into a plurality of slices. For each slice in the plurality of slices, the steps further include sampling a sensor associated with a head mounted display to generate sample data corresponding to the slice; adjusting one or more parameters associated with rendering operations for the slice based on the sample data; and rendering primitive data associated with a model according to the rendering operations to generate image data for the slice. Each slice is a portion of the frame and corresponds to different sample data from the sensor. Thus, adjusting of the parameters is different for each slice of the frame.

DETAILED DESCRIPTION

In order to reduce the rendering latency associated with virtual reality systems, each frame of video may be subdivided into M sub-frames, where each sub-frame is prepared, rendered, and displayed independently. A virtual reality system typically includes a head-mounted display (HMD) that includes sensors for tracking a position and/or orientation of the HMD. For example, the HMD may include accelerometers or gyroscopes for tracking a position or orientation of the HMD. The tracking information may be used to update a viewpoint associated with a frame being rendered. The sensors may have a high sampling frequency (e.g., 1000 Hz) which updates the tracking information much faster than the refresh rate of the HMD. Furthermore, the rendering latency from the time the tracking information is sampled for a frame until the time the frame is displayed to a user may be significant (e.g., up to tenths of a second).

Rendering latency may be due to the processing required when rendering a frame. First, a processor such as a central processing unit (CPU) may update a model based on the sampled tracking information. For example, the processor may adjust a viewpoint associated with the model being rendered. The processor may also configure a parallel processing unit such as a graphics processing unit (GPU) to render a frame of image data based on the model. Once the processor has configured the parallel processing unit to render the image frame, the parallel processing unit may read the graphics data that represents the model from a memory and render the image data, storing the image data in a buffer in a memory. Once the frame has been fully rendered, the processor or parallel processing unit may cause the image frame to be scanned out to the display by utilizing existing hardware to generate video signals transmitted to the display over a video interface based on the image data in the buffer.

It will be appreciated that the parallel processing unit may be idle while the processor is updating the model and configuring the parallel processing unit. Similarly, the processor may be idle when the parallel processing unit is rendering the frame of image data. Finally, both the processor and the parallel processing unit may be idle while the image data in the buffer is scanned out to generate the video signals for display. Rendering latency may be reduced by dividing the frame into different sub-frames and rendering each sub-frame sequentially in order to overlap processing of one sub-frame with processing of another sub-frame. Furthermore, the tracking information associated with each sub-frame may be updated as each sub-frame is rendered. In other words, tracking information may change within a frame such that the viewport associated with each sub-frame is updated accordingly. This modified rendering algorithm may reduce the effects caused by lag between the visual stimulus and motion of the HMD.

Figure 1:
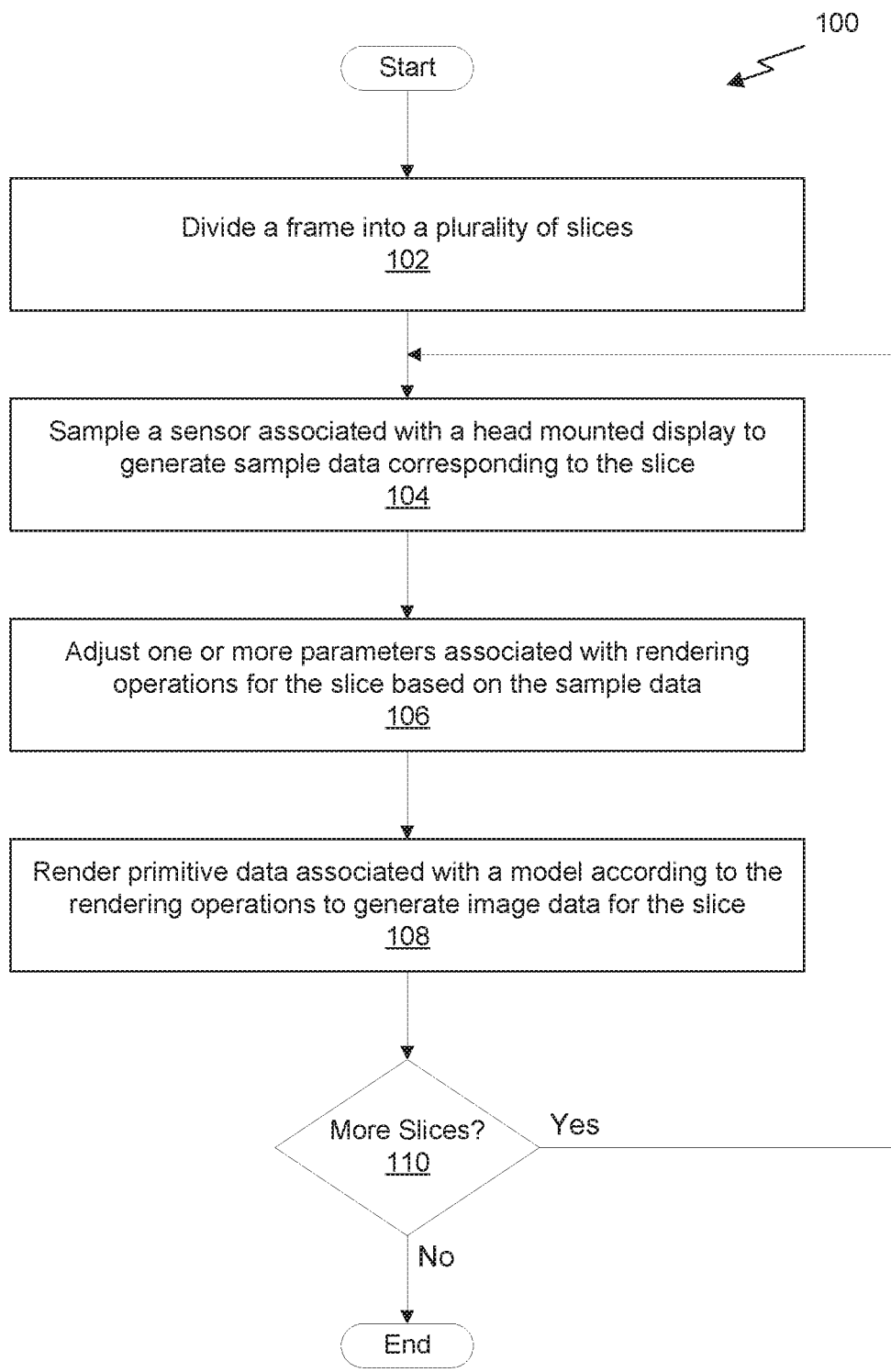
FIG. 1 illustrates a flowchart of a method for generating image data for a frame displayed in a head mounted display, in accordance with one embodiment.

FIG. 1 illustrates a flowchart of a method 100 for generating image data for a frame displayed in a head mounted display, in accordance with one embodiment. At step 102, a frame is divided into a plurality of slices. The frame may comprise a two-dimensional array of pixels having a horizontal and vertical resolution corresponding with a display device or display devices in the HMD. In one embodiment, the frame is divided into a first portion intended to be displayed to the left eye of the viewer and a second portion intended to be displayed to the right eye of the viewer. The image data for the first portion and the second portion may be generated independently and stored in a common frame buffer that comprises image data for display on a single display device. In another embodiment, the frame comprises image data for two separate images stored in two separate and distinct frame buffers. Each frame buffer may store image data for one eye of the viewer. The separate frame buffers may correspond to separate and distinct display devices, corresponding to distinct eyes of the viewer, in the HMD.

In one embodiment, the frame is divided into a plurality of slices, each slice representing a number of rows of pixels within the frame. In other words, every N rows of pixels in the frame is included in a separate and distinct slice. In one embodiment, the frame is divided into 16 slices. For a frame having a resolution of 2560×1440 pixels, each slice will comprise 90 rows of pixels and have a resolution of 2560× 90. It will be appreciated that the frame may be divided into a different number of slices (e.g., 4 slices, 8 slices, 32 slices, etc.) and that the size of each slice may be adjusted to maximize the refresh rate of the HMD. Once the slice size has been determined and the frame has been divided into a plurality of slices, each slice may be processed sequentially to generate image data for display. Steps 104 through 110 are performed on a per slice basis.

At step 104, a sensor associated with the HMD is sampled to generate sample data corresponding to the slice. The sensor may include a multi-axis accelerometer and a multi-axis gyroscope to track the HMD position and/or orientation. The sensor data may include a vector that identifies a position and/or orientation of the HMD worn by the viewer. In one embodiment, a processor transmits a signal to the sensor to sample the sensor's current values for position and/or orientation. The sensor may transmit a signal back to the processor that includes sample data specifying the current position and/or orientation of the HMD. The sample data may be stored in a memory such that the position and/or orientation of the HMD may be used by an application configured to generate image data for display on the HMD.

At step 106, one or more parameters associated with rendering operations for the slice are adjusted based on the sample data. The one or more parameters may include parameters specifying a transformation matrix and/or a viewport. The transformation matrix may be applied to the vertices during a vertex shader stage of a graphics rendering pipeline and the viewport may specify a mapping from world space to screen space. As is well-known in VR systems, the image data displayed on the HMD will be generated based on the position and/or orientation of the HMD.

At step 108, primitive data associated with a model is rendered according to the rendering operations to generate image data for the slice. The image data for the slice may be stored in a frame buffer. Again, in one embodiment, image data for a left eye of the slice is stored in a first frame buffer and image data for a right eye of the slice is stored in a second frame buffer.

At step 110, a processor determines whether at least one additional slice should be processed. If one or more slices of the frame still need to be rendered, then the method 100 returns to step 104 and the next slice of the frame is processed. However, if all slices of the frame have been processed then the method 100 terminates. It will be appreciated that the method 100 may be repeated for the next frame of image data.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
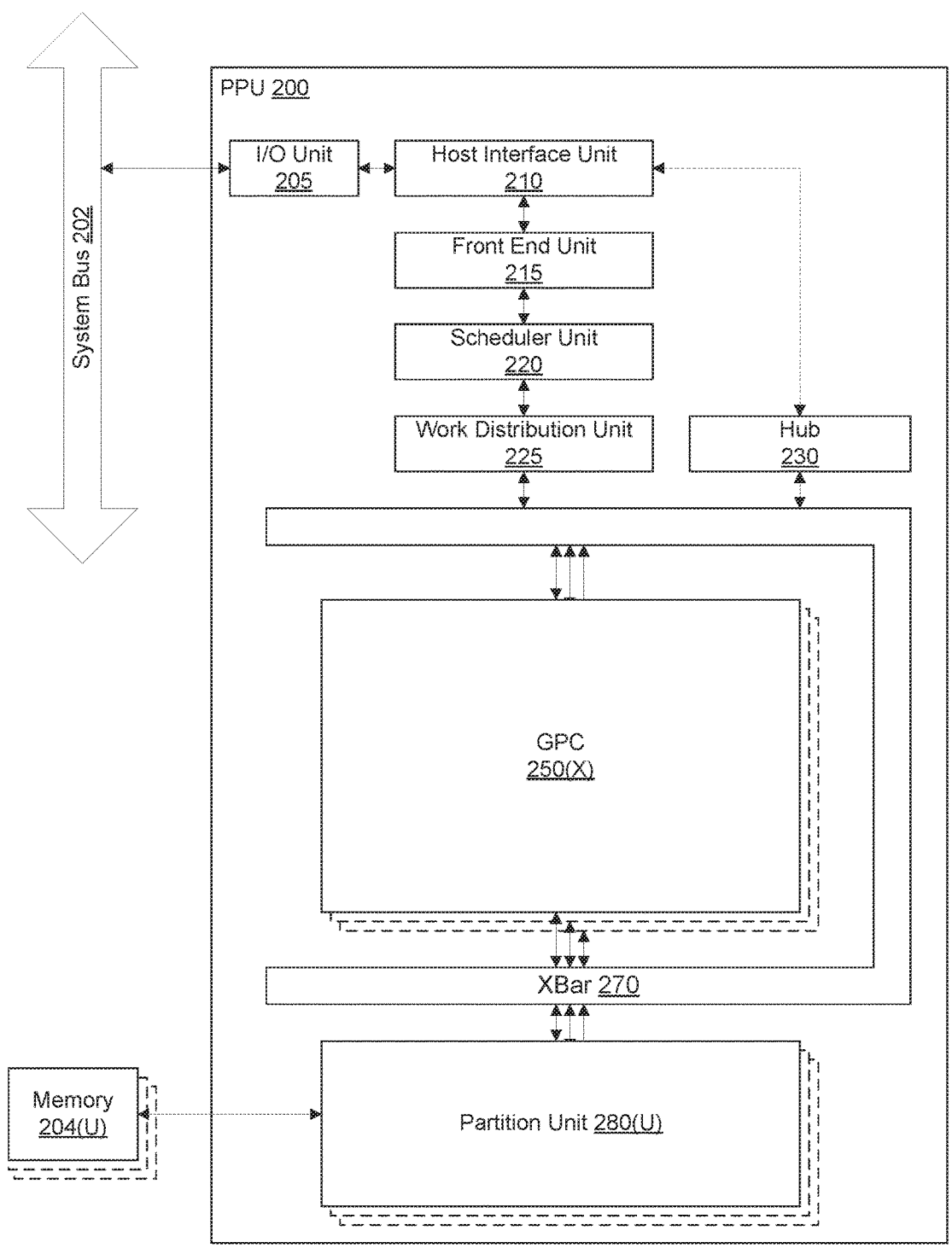
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
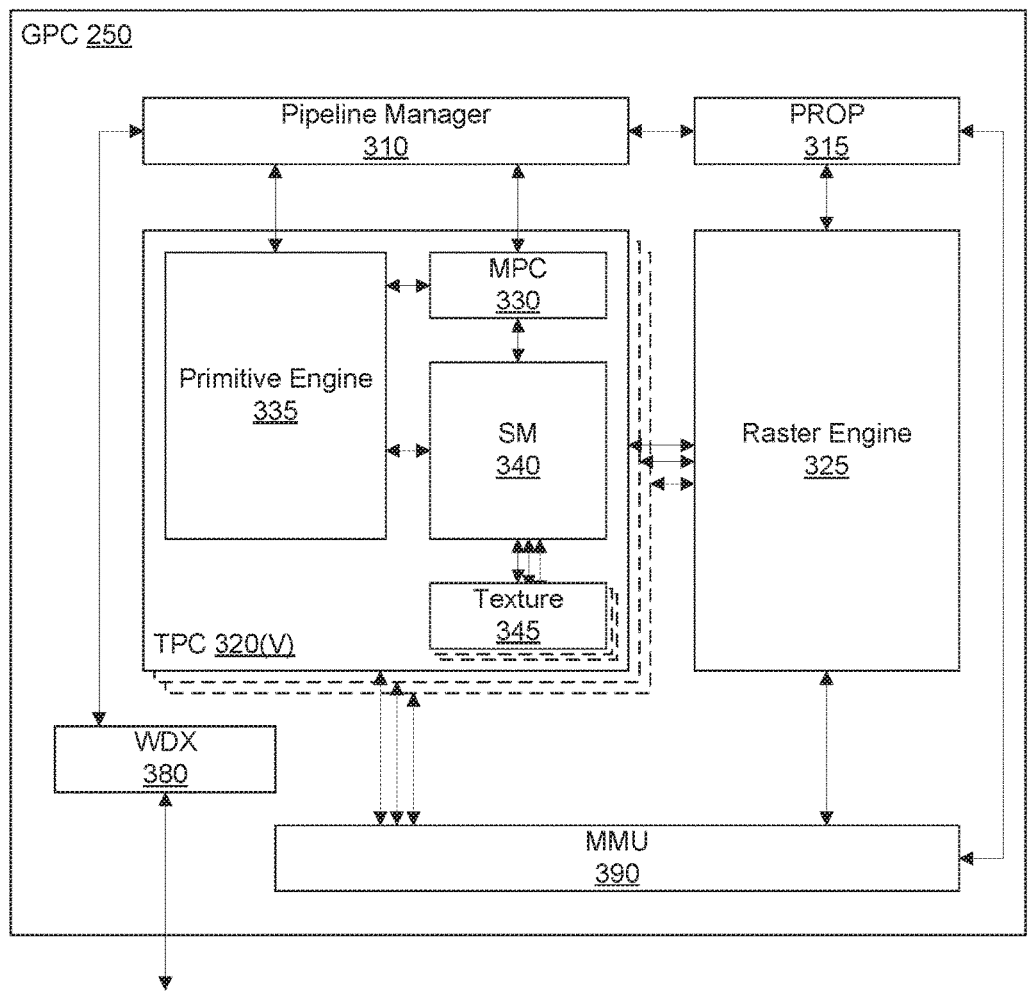
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The XBar 270 provides an interface between the GPC 250 and the partition unit 280. The MMU 390 may provide translation of virtual addresses into physical addresses, memory protection, and arbitration of memory requests. Memory requests may be transmitted from the MMU 390 to the partition units 280 via the XBar 270. In one embodiment, the MMU 390 provides one or more translation lookaside buffers (TLBs) for improving translation of virtual addresses into physical addresses in the memory 204.

Figure 3B:
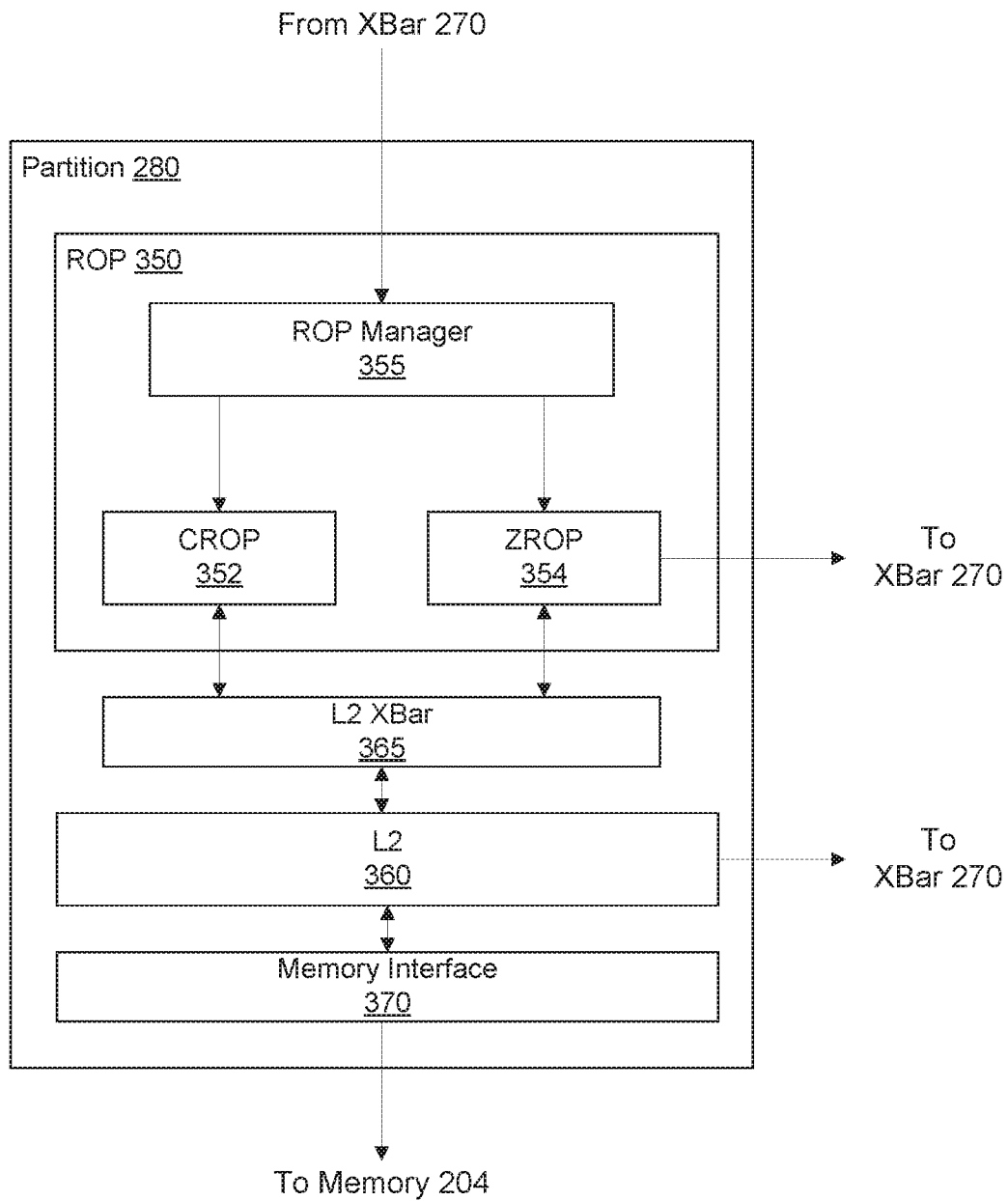
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
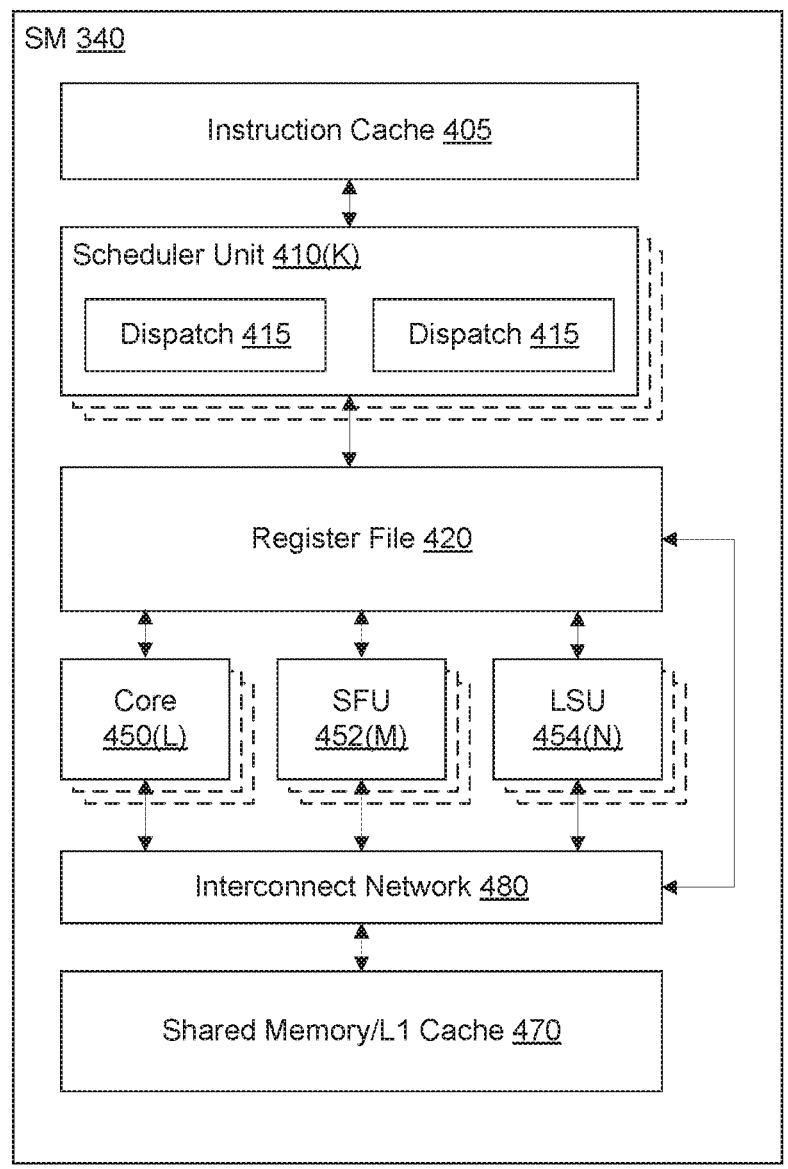
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises A SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
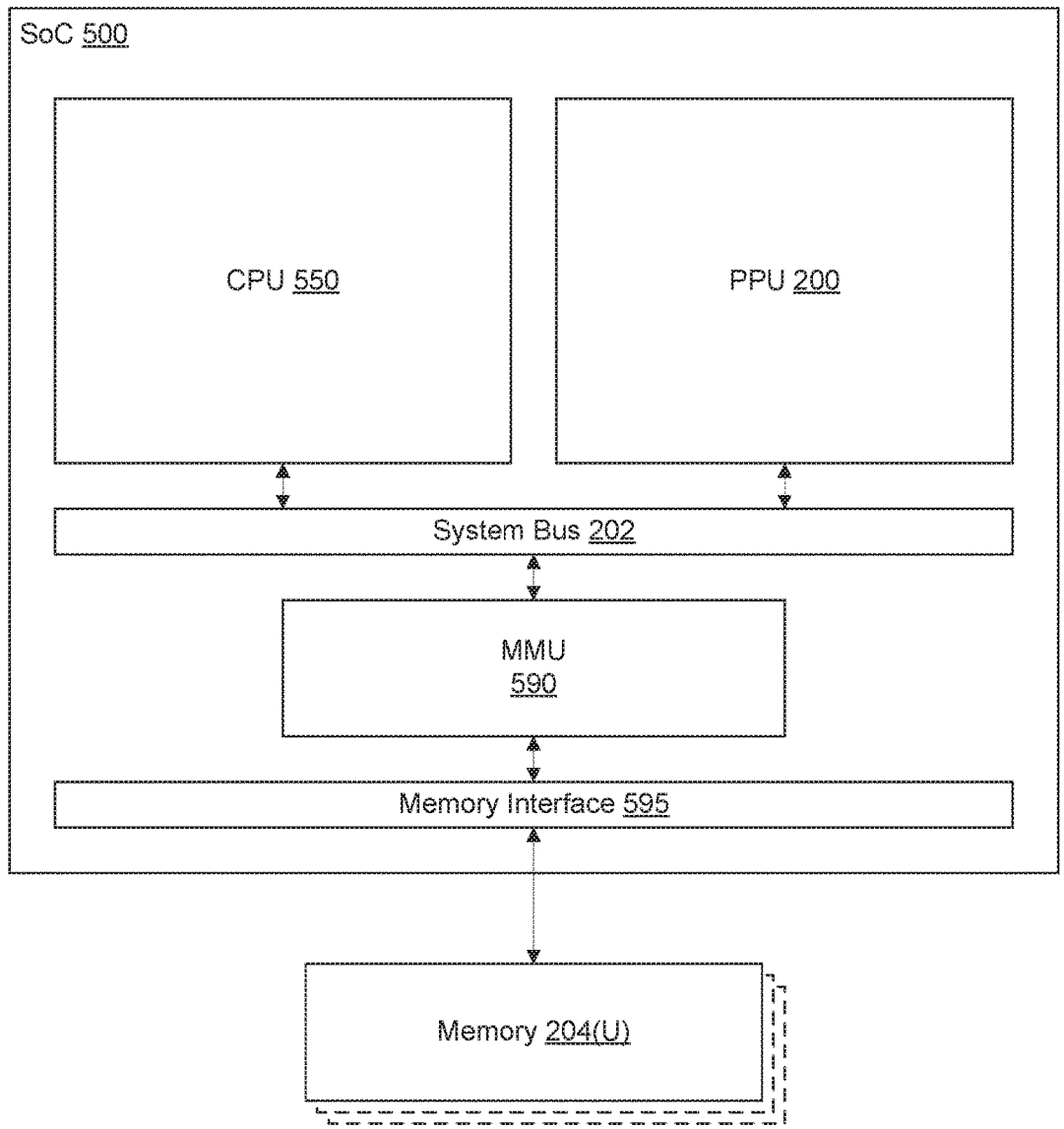
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
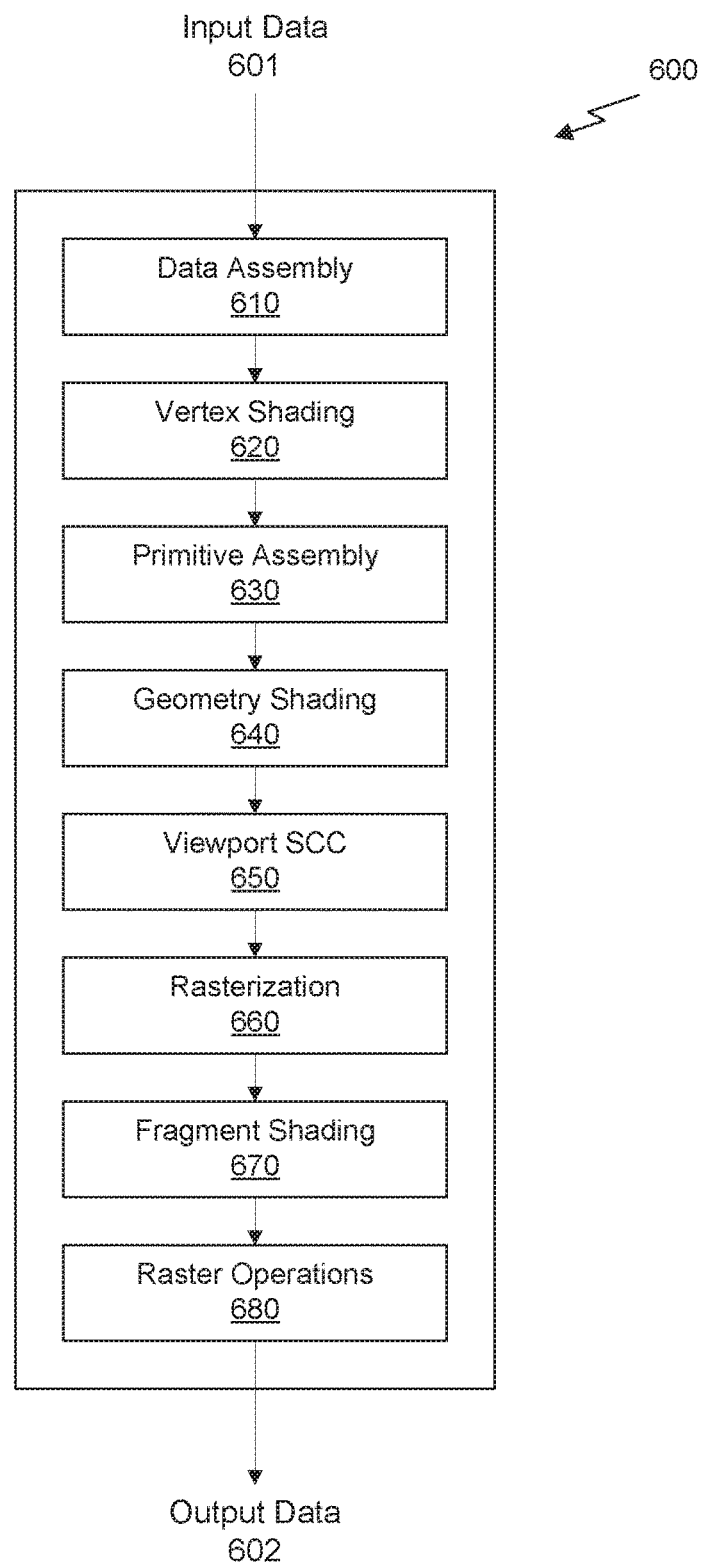
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API.

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate properties such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum.

Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments. The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Virtual Reality System

Figure 7A:
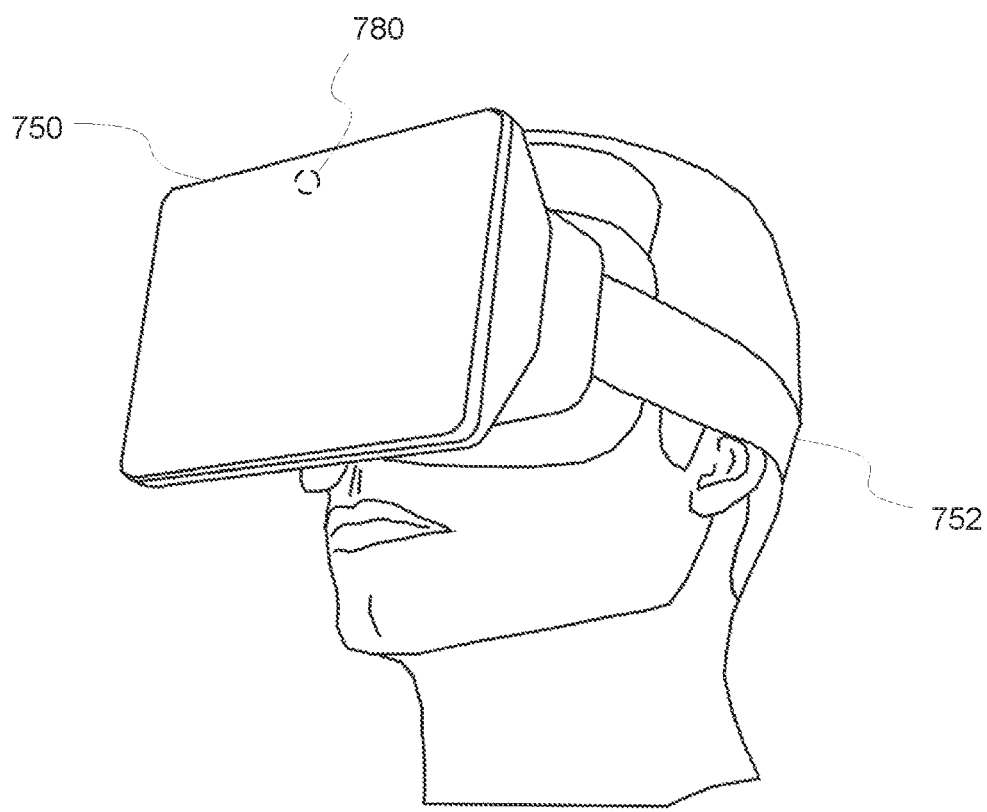
FIGS. 7A and 7B illustrate a head mounted display of a virtual reality system, in accordance with one embodiment.
Figure 7B:
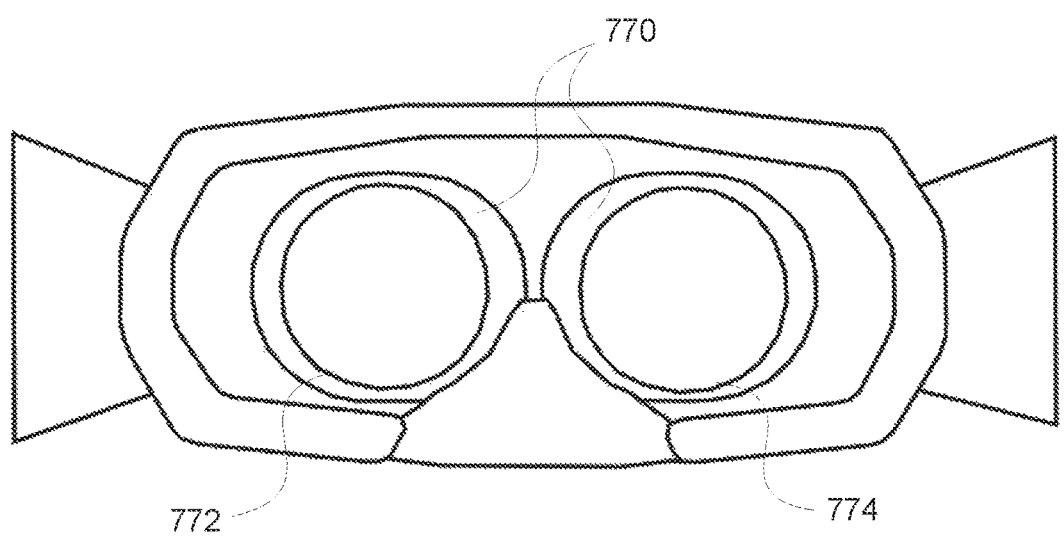

FIGS. 7A and 7B illustrate a head mounted display (HMD) 750 of a virtual reality system, in accordance with one embodiment. The HMD 750 may include a body that is worn over the eyes of a user. The body may be formed from plastic and/or metal materials and may be secured to the user's head via a head strap 752. The body may contact the user's face and shield the user's eyes from external light sources. The body may include a gasket material, such as foam, rubber, or another pliable material used for comfort, on any surfaces that contact the user's face.

As shown in FIG. 7B, the HMD 750 may include a display device 770 that is configured to project a left image to a left eye of the user and a right image to a right eye of the user. In one embodiment, the display device 770 may comprise a liquid crystal display (LCD) including an LED (light emitting element) backlight. In another embodiment, the display device 770 may comprise an OLED display. The HMD 750 may also include a pair of lenses that distort the image projected by the display device 770 to each eye: a left lens 772 for a left image and a left eye of the user; and a right lens 774 for a right image and a right eye of the user. The lenses may distort the light projected by the display device 770 to compensate for the short distance between the user's eyes and the surface of the display device 770.

In other embodiments, the display device may comprise two separate displays, one display for each eye. In other words, rather than display both the left eye image and the right eye image on the same display device at different locations corresponding roughly to the location of the lenses 772 and 774, respectively. A dedicated left display device is configured to display a left eye image and a separate dedicated right display device is configured to display a right eye image. In yet other embodiments, the lenses will be omitted such that the user views the display devices directly. It will be appreciated that the display technology is not restricted to LCD display technology or OLED display technology and may include other types of display technology for projecting an image onto the eyes of a user.

Although not shown explicitly in FIGS. 7A and 7B, the HMD 750 may include a processor, memory, and communications hardware. In one embodiment, the HMD 750 includes an SoC, such as SoC 500, that includes a CPU core as well as one or more GPU cores. Each of the GPU cores may be similar to PPU 200. The HMD 750 may receive applications and/or data via a communications interface and store the applications and/or data in the memory. The memory may be a volatile memory such as Synchronous Dynamic Random Access Memory (SDRAM) as well as a non-volatile memory such as a flash memory or solid state drive. The SoC may execute the application or applications and process the data to generate the images for display on the HMD 750.

The communications hardware may include a radio antenna as well as logic for implementing a wireless communications interface such as Bluetooth or WiFi (i.e., IEEE 802.11). The HMD 750 may connect to a network through the communications interface and download applications or data from a network location. In one embodiment, the HMD 750 may include a wired communications interface such as a USB interface for transferring applications or data from a host computer to the memory.

In another embodiment, the HMD 750 is merely a slave display device that receives video signals over the communications interface. In such embodiments, a host computer executes an application that generates video data stored in a memory of the host computer. The video data may be transformed into a video signal that is transmitted from the host computer to the HMD 750 via the communications interface. In one embodiment, the communications interface is an HDMI interface that transmits video data for both the left eye image and the right eye image for a plurality of frames of stereoscopic video to the HMD 750. In other embodiments, the communications interface may be a high-speed USB 3.0 interface. In yet other embodiments, the communications interface receives video data via a wireless interface such as Bluetooth or WiFi.

The HMD 750 also includes one or more sensors 780 that collect data about a position and/or orientation of the HMD 750. The sensor(s) 780 provide feedback about the position and/or orientation of the HMD 750 to the processor executing the application. The position and/or orientation of the HMD 750 may be used to generate the images for display. For example, the viewing frustum associated with the graphics pipeline used to generate the images for display may be updated based on the feedback provided by the sensors 780. The sensors 780 may provide data samples at a rate of 1 kHz, or approximately one sample per millisecond. In one embodiment, the HMD 750 may include a three-axis accelerometer for measuring acceleration in a coordinate system of three orthogonal axes (e.g., x, y, and z). The accelerations may be used to track a position of the HMD 750. In another embodiment, the HMD 750 may include a gyroscope, an accelerometer, and/or a magnetometer. The accelerations, angular velocities, and magnetic fields may be used to track a position and orientation of the HMD 750. Each of the sensors 780 may be multi-axis corresponding to the three axes of the coordinate system.

It will be appreciated that the sensors 780 collect data at rates (e.g., 1000 Hz) that far exceed the frame rate of the HMD 750 (e.g., 90 fps). Even in the best circumstances, it may be tens or hundreds of milliseconds before motion tracked by the sensors 780 causes a corresponding relative motion in objects that appear on the display device 770 of the HMD 750. A user may experience nausea caused by this discontinuity between the perceived motion sensed by the visual system and the vestibular system. Decreasing the latency between a time motions are sensed by the vestibular system and a time such motions are reflected on the display device 770 may reduce the amount of nausea experienced by a user of a virtual reality system. However, simply increasing the frame rate is an insufficient solution because faster frame rates require the image data to be rendered faster as well. The complexity of a scene is therefore limited to the time available for rendering and a throughput rate of the graphics processing apparatus (e.g., a GPU or GPUs). As the time available for rendering decreases with increasing frame rates, the limitations placed on the complexity of the scene may fall below some minimum acceptable level for image quality. Lower image quality would reduce users' interest in using the virtual reality system. Another approach that reduces the latency between the sampling of the sensors and the reflection of the sensed motion in image data displayed by the display device 770 is therefore required.

Figure 8A:
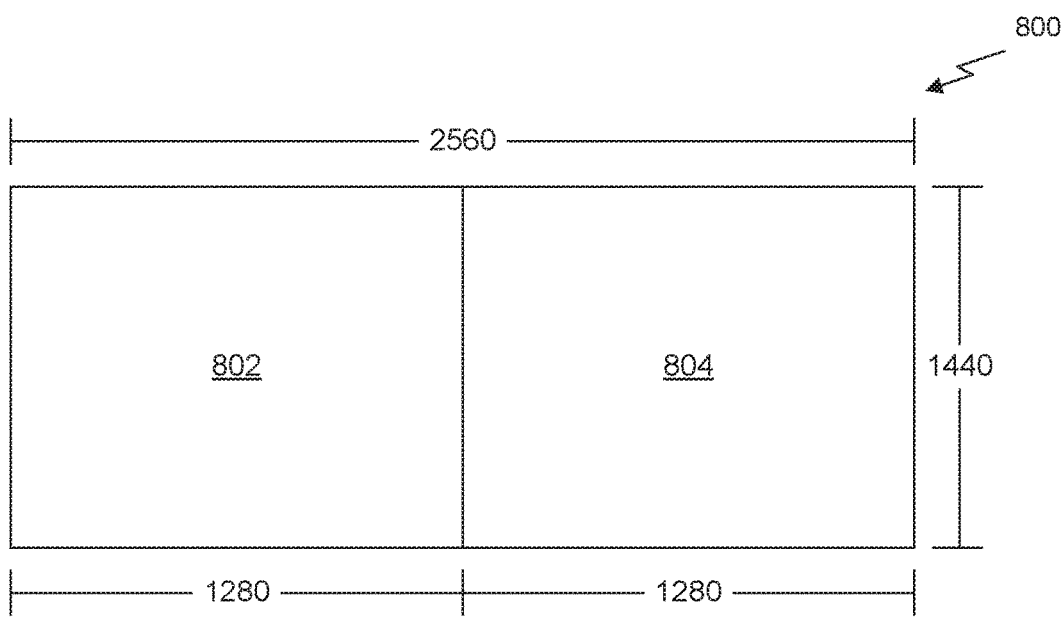
FIGS. 8A and 8B illustrate a stereoscopic image frame for display in a virtual reality system, in accordance with one embodiment.
Figure 8B:
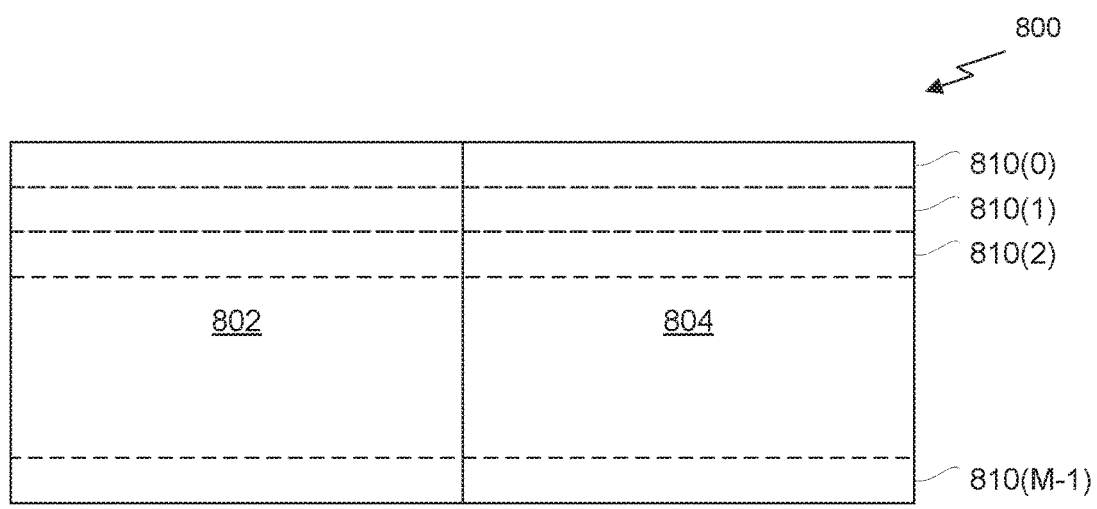

FIGS. 8A and 8B illustrate a stereoscopic image frame for display in a virtual reality system, in accordance with one embodiment. As shown in FIG. 8A, the stereoscopic image frame 800 includes both a left eye image 802 and a right eye image 804. In one embodiment, the frame 800 is a two-dimensional array of pixels, where each pixel is associated with values for a number of color components of the pixel. For example, each pixel in the frame may include a 10-bit value for a red channel, a 10-bit value for a green channel, and a 10-bit value for a blue channel. Alternately, each pixel may include 32-bits for four channels, such as red, green, blue, and alpha, with each channel being associated with an 8-bit value in the 32-bits. Other pixel formats are contemplated as being within the scope of the present disclosure and will typically match a native pixel format of a display device included in the virtual reality system.

The frame 800 is formatted at a WQHD format that is 2560 pixels wide and 1440 pixels high. The frame 800 is split such that the pixel data for the left eye image 802 is included in the left 1280 columns of the frame 800 and the pixel data for the right eye image 804 is included in the right 1280 columns of the frame 800. Thus, each of the left eye image 802 and the right eye image 804 include 1280×1440 pixels. In one embodiment, the display device 770 of the HMD 750 may have a native resolution that matches the frame 800 (e.g., 2560×1440). In another embodiment, the display device 770 of the HMD 750 is comprised of two separate displays having a native resolution that matches the left eye image 802 or the right eye image 804 (e.g., 1280×1440). In yet other embodiments, the frame 800 (or each of the left eye image 802 and right eye image 804) may be scaled to match the native resolution of the display device(s) 770 of the HMD 750. Alternately, the resolution of the frame 800 may be changed to match a resolution of the display device 770.

One technique for decreasing the latency between the sensor data and displaying updated image data on the display device 770 is implemented by sequentially rendering and scanning out sub-frames of the image data rather than waiting to scan out an entire image frame. In other words, a first portion of a frame may be rendered and scanned out, then a second portion of a frame can be rendered and scanned out, then a third portion of a frame can be rendered and scanned out, and so forth. The process can also be pipelined in order to hide some of the latency. For example, scan out of one portion of the image may be performed while the next portion of the image is being rendered.

Furthermore, some operations associated with rendering may only need to be performed once for the whole frame while other operations associated with rendering may be performed at a sub-frame level. For example, a model may be updated by a physics engine of an application once per frame to reflect relative motions of objects within the scene (i.e., where virtual objects move relative to other virtual objects and/or a model coordinate system). Sensor data received from the HMD 750 may be used to adjust parameters used for rendering the model to generate 2D image data. However, instead of updating the parameters once for an entire frame, the parameters can be updated at a sub-frame level, causing the virtual camera position to shift between sub-frames.

As shown in FIG. 8B, the frame 800 is divided into a number of slices 810. Each slice 810 represents a portion (i.e., subset) of the frame, wherein each portion is a number of rows of pixel data. In one embodiment, the frame 800 is divided into 16 slices 810. In this embodiment, each slice 810 comprises 90 rows of pixels, each row of pixels being 2560 pixels wide. However, in other embodiments, the frame 800 may be divided into a different number of slices 810.

Each slice 810 may be rendered and displayed independently in order to reduce the latency from sampling to display. The latency is reduced because each slice 810 includes a smaller number of pixels to be rendered. Thus, many graphics primitives of the model may be discarded as not intersecting a particular slice. Discarding graphics primitives early in the graphics pipeline helps reduce the time to render a particular scene. However, latency reductions may also be realized due to other factors.

Figure 9:
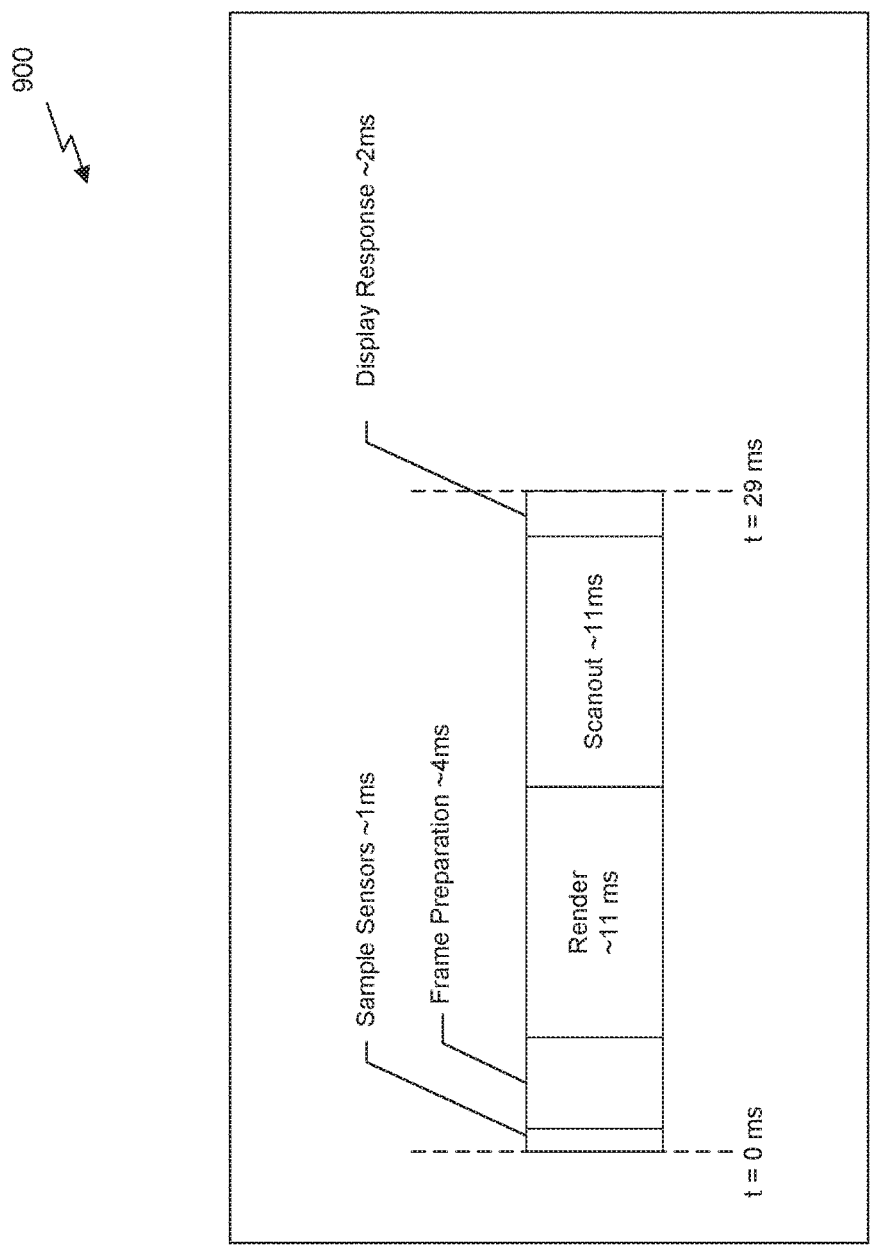
FIG. 9 illustrates a timing diagram for generating image data for a frame, in accordance with one embodiment.

FIG. 9 illustrates a timing diagram 900 for generating image data for a frame 800, in accordance with one embodiment. At a time t=0 ms, the sensors 780 of the HMD 750 are sampled to determine a position and/or orientation of the HMD 750. Sampling the sensors 780 takes approximately 1 ms. At time t=1 ms, a processor (i.e., a CPU) may prepare the frame 800 for rendering. In one embodiment, a graphics application such as a computer game uses a game engine to update a model. Objects in the model may be moved according to a physics engine, lighting may be changed, new objects may be added to the model, commands from input devices such as a mouse or a keyboard may be handled, and so forth. The processor may generate rendering commands to be executed by a parallel processing unit such as PPU 200. In one embodiment, the application may generate a set of API calls associated with a driver (i.e., a software application executed by the CPU) that implements the API. The API calls may identify primitives in the model to be rendered, configure a frame buffer to store the image data for the frame, configure a viewport or viewports, specify a transformation matrix based on the position and/or orientation of the HMD 750, and so forth. The driver translates the API calls into microcode capable of being executed by the parallel processing unit. In one embodiment, a driver may cause instructions to be transmitted to the parallel processing unit over an interface. Preparing the frame to be rendered may take approximately 4 ms. It will be appreciated that the duration of the frame preparation step may be more or less than the 4 ms illustrated in FIG. 9. The duration may depend on variables such as the number and/or types of API calls implemented by the application, a complexity of the model, and so forth. Thus, the timing shown in FIG. 9 is for illustrative purposes only and actual durations may be different.

At time t=5 ms, the parallel processing unit renders the graphics primitives to generate pixel data for the frame 800. In one embodiment, the commands issued by the driver configure the various execution units in the parallel processing unit to implement, at least in part, the graphics processing pipeline 600. The parallel processing unit generates pixel values stored in the frame buffer in a memory. Rendering the graphics primitives may take approximately 11 ms. At this point, the frame buffer is full of image data that represents the next frame to be displayed. Again, it will be appreciated that the duration of the rendering step may be dependent on the complexity of the scene and the algorithm implemented by the application/graphics pipeline. The duration of 11 ms shown in FIG. 9 is approximately equal to the frame duration associated with a 90 Hz refresh rate of the display. Slower or faster refresh rates may correspond to different durations of the rendering step.

Furthermore, the duration of the rendering step shown in FIG. 9 may be divided into rendering of the left eye image and the right eye image. In one embodiment, the rendering operations may be divided between two or more parallel processing units such that the left eye image and the right eye image may be rendered in parallel. Dividing the rendering operation between multiple parallel processing units may reduce the duration of the rendering step (at the same rendering quality) or may enable more complexity within the model to be rendered in the same amount of time.

At time t=16 ms, the frame buffer is scanned out to the display device 770. In one embodiment, a hardware unit reads out the pixel data in row-major order to generate video signals over a video interface such as an HDMI or DVI interface. The timing of the video signal may be based on the specification of the particular interface utilized and a refresh rate of the display device 770. The scan out operation may take approximately 11 ms.

Each display may be associated with a response time that indicates a time a pixel element takes to change to a new color. For example, a new voltage causes the liquid crystal layer in an LCD pixel element to twist in response to the new voltage. The response time may be a delay from when the voltage is changed to when the liquid crystal layer has realigned in response to the new voltage. Typical response times for pixel elements in a display may be approximately 2 ms. Thus, even though the scanout may be completed at t=27 ms, all pixels in the display may not display the true colors until t=29 ms.

As the timing diagram 900 makes clear, the latency from a time when a sensor is sampled to a time when light associated with the new sampled sensor data is projected from a display is on the order of 30 ms. The timing diagram 900 provides approximate times for each operation, but actual times required by each operation may be different. In particular, rendering time may change based on the number of graphics primitives being rendered and the types of rendering operations performed. Similarly, the time to translate API calls may change based on the number and type of API calls issued by an application. Response time of the display will also depend on the display type (e.g., LCD, OLED, etc.). It is readily apparent that the long latency between sampling and display is undesirable.

Figure 10:
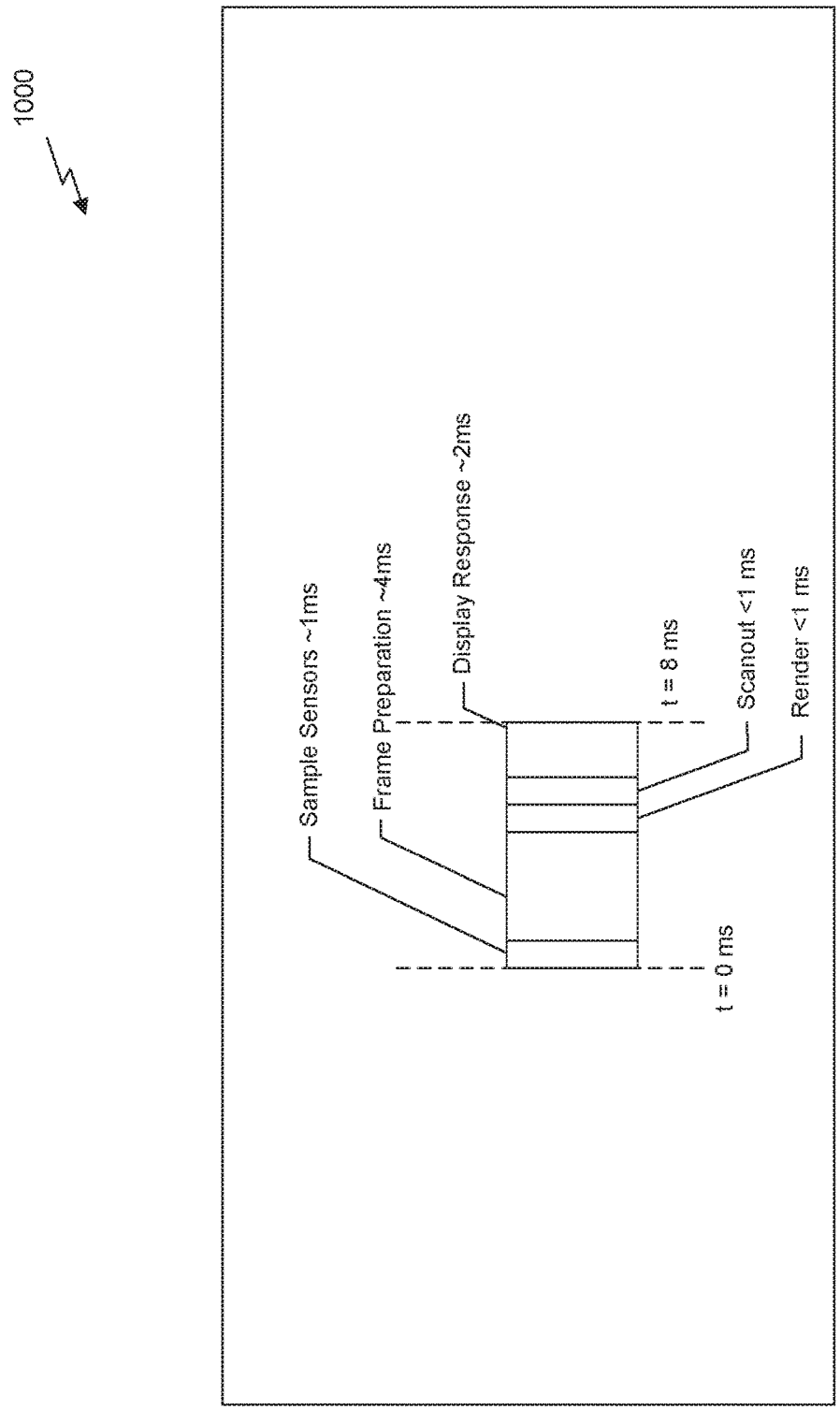
FIG. 10 illustrates a timing diagram for generating image data for a slice of the frame, in accordance with one embodiment.

FIG. 10 illustrates a timing diagram 1000 for generating image data for a slice 810 of the frame 800, in accordance with one embodiment. The latency between sampling and display of a slice 810 of the frame 800 is much shorter than the latency between sampling and display of the frame 800. The number of primitives that intersect a slice 810 is much lower that the number of primitives that intersect the frame 800, which reduces rendering time. In addition, slice preparation time may be reduced when compared to frame preparation time as fewer operations will need to be performed for the slice than the full frame.

As shown in FIG. 10, the latency is reduced to under 10 ms when rendering and displaying a slice 810 of a frame compared with rendering and displaying the entire frame 800. At time t=0 ms, the sensors of the HMD 750 are sampled to determine a position and/or orientation of the HMD 750. Again, sampling the sensors takes approximately 1 ms. At time t=1 ms, the processor prepares the slice 810 for rendering. Preparing the slice 810 for rendering may be similar to preparing the frame 800 for rendering. Frame preparation may be broken down into specific operations; e.g., frame preparation may include modifying the model based on the physics engine, calculating a transformation matrix, setting up viewports, and so forth. Some of these operations are done at a frame level (i.e., once per frame) and other operations may be done on a slice level (i.e., once per slice).

In one embodiment, the application may update the model prior to rendering the first slice 810(0) of a frame 800. However, once the model has been updated, the model is not changed when rendering subsequent slices (i.e., slice 810(1), 810(2), . . . and 810(M−1)). In contrast, the parameters associated with the rendering operations may be updated for each slice 810, thereby changing the perspective of the model rendered to the display. Thus, the frame preparation step for rendering and displaying the first slice 810(0) may take longer than the frame preparation step for rendering and displaying the subsequent slices (i.e., slice 810(1), 810(2), . . . and 810(M−1)) because the application may omit some operations when preparing the subsequent slices. The frame preparation step for a slice 810 may not be totally reduced to 1/M of the time of the frame preparation step for the frame 800 because the reduction in number of pixels does not correspond to a proportional reduction of operations in the frame preparation step. As shown in FIG. 10, the duration of the frame preparation step for rendering the first slice 810(0) of a frame 800 may be approximately 4 ms, although this duration may be even further reduce for subsequent slices 810 of a frame 800.

At time t=5 ms, the parallel processing unit renders the graphics primitives to generate pixel data for the slice 810. It will be appreciated that the full model may be transmitted to the parallel processing unit for rendering, in the same manner as when rendering the full frame 800. However, early culling of graphics primitives that do not intersect the slice 810 may drastically improve rendering performance when compared to rendering the full frame 800. Alternatively, a processor may perform a first pass of the graphics primitives during the frame preparation step for all slices of a frame, binning the graphics primitives based on which slices the graphics primitives intersect. Then, during rendering of each slice, only the graphics primitives of the model shown to intersect a particular slice are transmitted to the parallel processing unit when rendering that slice. Rendering time for a slice 810 may be reduced to approximately 1/M the rendering time for a frame 800, although this will still depend on the number of graphics primitives that intersect each slice. In the case where the frame 800 is divided into 16 slices 810, rendering time may be reduced to less than 1 ms.

At time t=6 ms, the portion of the frame buffer associated with the slice 810 is scanned out to the display device 770. In one embodiment, video signals are generated that only include pixel values for the pixels in the slice 810. The display device 770 may be configured to only update the pixel elements associated with the slice 810 rather than all pixel elements in the display. In such cases, the time associated with the scan out operation for a slice 810 is reduced by 1/M when compared to the time associated with the scan out operation for the full frame 800. Thus, a duration of the scan out operation for a slice 810 may be less than 1 ms, as shown in FIG. 10. The slice 810 is now displayed on the display device 770 once the response time has elapsed.

Thus, the latency between sampling and display when rendering the slice 810 may be significantly reduced. For example, the latency may be under 10 ms for a slice 810 when compared to 30 ms for a frame 800. Of course, all of the slices must be rendered sequentially and displayed on the display device 770 in order. However, motion detected by the sensors of the HMD 750 will be reflected on at least a portion of the display device 770 much faster than when rendering each frame 800 in the entirety prior to display.

It will be appreciated that changing the rendering parameters between slices may result in image artifacts when the entire frame is considered as a whole. In other words, if all of the slices 810 for a frame 800 were presented on the screen concurrently, objects that intersect more than one slice may appear shifted in a horizontal direction between slice 810 boundaries (i.e., a viewer may perceive tearing of the objects). The artifacts are due to updating the rendering parameters based on the sample data of the sensors 780 between rendering of the slices 810. However, in one embodiment, each slice 810 is displayed independently, with all pixels not included in that particular slice 810 displayed as black pixels. Thus, no two slices 810 of the same frame are ever displayed concurrently. By refreshing the display at extremely fast refresh rates such that each slice 810 of a frame 800 is displayed in sequential order, the visual system of a user may integrate the independent slices 810 into a full frame 800. However, the high refresh rate will make it difficult for a viewer to perceive any of the image artifacts that may be more obvious if all of the slices 810 for a frame 800 were displayed concurrently.

Figure 11:
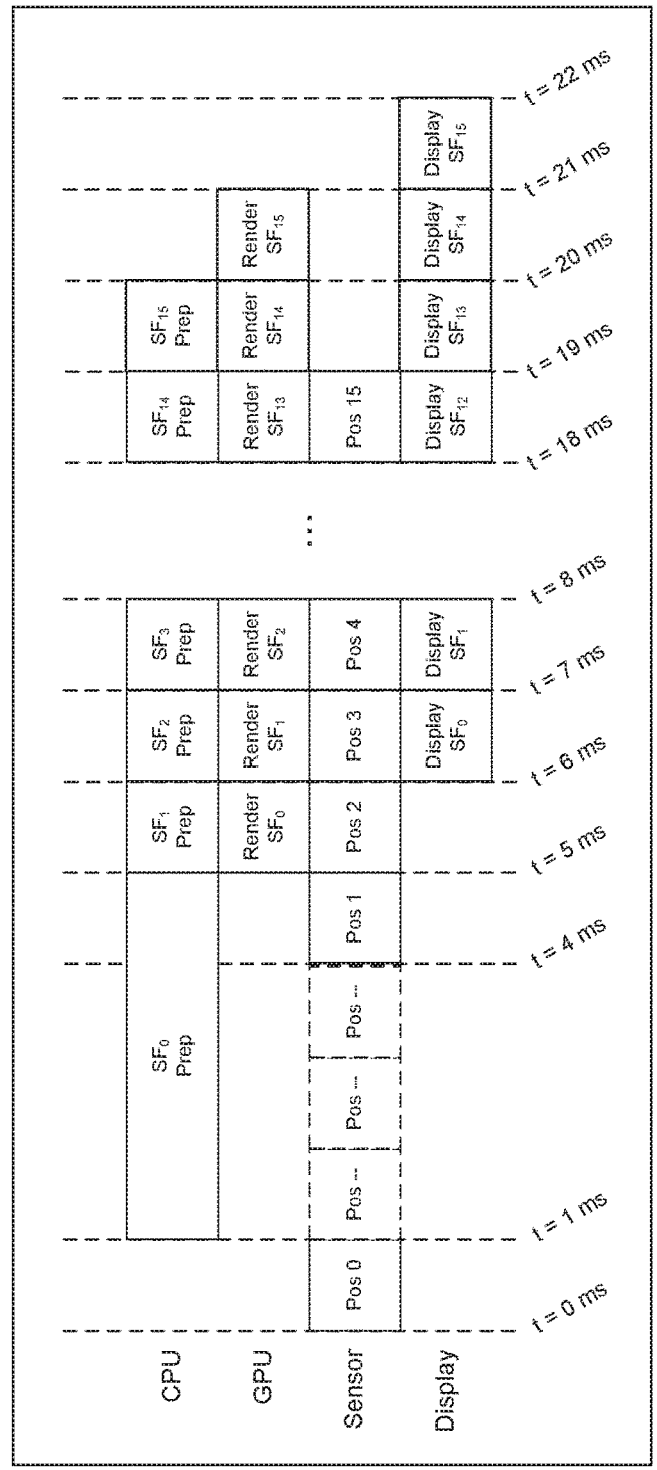
FIG. 11 illustrates a timing diagram for generating image data for a plurality of slices for the frame, in accordance with one embodiment.

FIG. 11 illustrates a timing diagram 1100 for generating image data for a plurality of slices 810 for the frame 800, in accordance with one embodiment. The timing diagram 1100 shows operations performed by a CPU, a GPU, the sensors of the HMD 750, and a display device 770. In one embodiment, the CPU represents a CPU core of an SoC 500 and the GPU represents one or more GPU cores of the SoC 500.

As shown in FIG. 11, the rendering of a frame 800 begins with sampling a sensor to collect position and/or orientation information. At time t=0 ms, the application executed by the CPU may cause the sensor 780 to collect sample data. In one embodiment, the application may trigger a hardware interrupt that causes a signal to be transmitted to the sensor 780. The signal may trigger the sensor 780 to collect a sample that specifies the position and/or orientation of the HMD 750 and store the sample data in a memory (i.e., registers) of the sensor 780. The sensor 780 may be coupled to the SoC 500 via a communications interface and the sample data may be transmitted to the SoC 500 to be stored in a memory associated with the SoC 500. Once the sample data is stored in the memory, the application may utilize the sample data. Again, sampling the sensor 780 may take approximately 1 ms.

At time t=1 ms, an application executing on the CPU may perform one or more sub-frame preparation operations for the first slice 810(0) of the frame 800 (labeled as "SF0 Prep" in FIG. 11). The sub-frame preparation operations may include view independent operations as well as view dependent operations. The view independent operations may include operations performed once per frame 800 and may affect all slices 810 of the frame 800. Examples of such operations may include updating the model via a physics engine. The view dependent operations may include operations performed for each slice 810 of the frame 800 and may be dependent on the sample data collected from the sensor 780. Examples of such operations may include processing the sample data to adjust parameters associated with rendering operations for the slice 810. The parameters for a first slice 810(0) may be updated based on the first sample data sampled at time t=0 ms. Additional sub-frame preparation operations may also be performed by the application, such as generating buffers of the model data and generating API calls which, when processed by a driver, will cause the GPU to render the first slice 810(0) or processing the model data to determine which objects intersect a slice 810. Although shown as being performed exclusively by the CPU, some of these operations may be performed, in part or in whole, by the GPU. The sub-frame preparation operations may take approximately 4 ms to perform.

While the sub-frame preparation operations are being performed by the CPU, the sensor 780 may be sampling the position and/or orientation of the HMD 750 every millisecond. The sub-frame preparation operations use a consistent position and/or orientation throughout processing of a single slice 810, such sample data being read into a memory at the beginning of the sub-frame preparation operations. Thus, some samples may be discarded if multiple samples are collected before sub-frame preparation operations are performed for the next slice 810.

At time t=5 ms, the GPU begins rendering operations to generate image data for the first slice 810(0). The image data may be stored in a frame buffer, or a portion of a frame buffer, corresponding to the first slice 810(0). At the same time, sub-frame preparation operations for the second slice 810(1) may be performed by the CPU. The sub-frame preparation operations for the second slice 810(1) may depend on second sample data ("Pos 1") collected from the sensor 780 at time t=4 ms. It will be appreciated that, in some embodiments, the sensor 780 may continuously sample a position and/or orientation of the HMD 750 at a fixed sampling frequency (e.g., 1 kHz), storing one or more samples in a memory of the sensor 780. The application may then request the latest sample data asynchronously at any time during sub-frame preparation operations. Therefore, sub-frame preparation operations for one slice 810 may be immediately followed by sub-frame preparation operations for the next slice within the CPU, one of the operations comprising an operation for reading the latest sample data from the sensor 780. Thus, while sub-frame preparation operations are being performed for the second slice 810(1), third sample data ("Pos 2") for a third slice 810(2) is being collected by the sensor 780.

At time t=6 ms, the image data for the first slice 810(0) is displayed on the display device 770. At the same time, fourth sample data ("Pos 3") for a fourth slice 810(3) may be collected and stored in the memory, slice preparation operations for the third slice 810(2) may be performed by the CPU, and rendering operations to generate image data for the second slice 810(1) may be performed by the GPU. After the response time of the display device has elapsed (e.g., at time t=9 ms) the image data for the first slice 810(0) is perceived by the viewer.

Each additional slice 810 is prepared based on new sensor data, rendered, and displayed in sequential order until all slices 810 of the frame 800 have been displayed. FIG. 11 shows that the full frame 800 will be displayed by time t=22 ms and after a delay for the response time of the display, the full frame 800 is perceived by the viewer in less than 25 ms. Due to the pipelined nature of the operations represented in FIG. 11, each new slice 810(1) through 810(M−1) will be perceived by the viewer at intervals approximating every millisecond. Thus, motion felt by the vestibular system begins to be perceived less than 10 ms after the motion begins and the full frame 800 is displayed in less time than were the frame to be completely rendered in its entirety as illustrated by the timing diagram 900 (i.e., ~9 ms for the first subframe and ~6 ms for subsequent subframes compared to ~30 ms for the full frame).

It will be appreciated that the durations for each operation shown in FIG. 11 are merely illustrative of the concept being described and that actual durations may vary. For example, the use of 1 ms durations for both sub-frame preparation operations, rendering, and display is merely approximate. It will be appreciated that with a full frame refresh rate of 90 Hz, that all M slices 810 will be displayed in approximately 11 ms, whereas the timing diagram of FIG. 11 shows the duration lasting 16 ms. In operation, sub-frame preparation operations, rendering operations, and scan out of the generated image data would be maintained at less than 1 ms intervals such that all slices 810 of the frame 800 could be displayed in the 11 ms limit.

Figure 12:
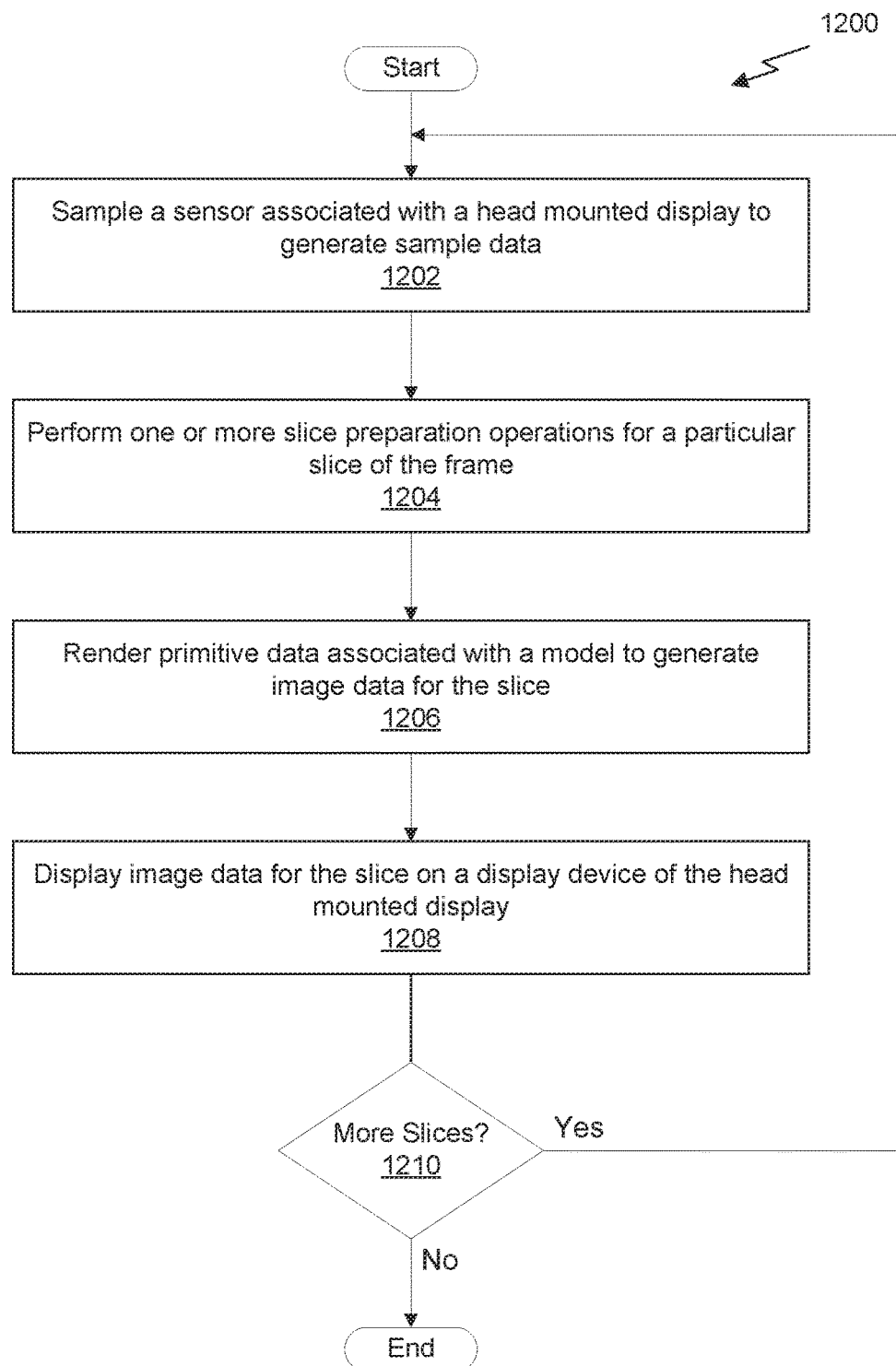
FIG. 12 illustrates a flowchart of a method for generating image data for a frame displayed in a head mounted display, in accordance with another embodiment.

FIG. 12 illustrates a flowchart of a method 1200 for generating image data for a frame 800 displayed in a HMD 750, in accordance with another embodiment. At step 1202, a processor, such as SoC 500, may sample a sensor 780 associated with the HMD 750. The sensor 780 may collect sample data that specifies the current position and/or orientation of the HMD 750. In one embodiment, the processor transmits a command to the sensor 780 that causes the sensor 780 to transmit sample data back to the processor. The sample data may be stored in a memory accessible to an application being executed by the processor. In another embodiment, the processor reads a register that includes the most recently sampled sensor information. The sensor 780 may update the data in the register each time the sensor 780 is sampled. The sensor 780 may have a fixed sampling frequency such that the register data is updated every sampling interval asynchronously with instructions of the application being executed by the processor.

At step 1204, a processor performs one or more sub-frame preparation operations for a particular slice 810 of the frame 800. In one embodiment, sub-frame preparation operations may include adjusting one or more parameters associated with rendering operations for the slice 810. Adjusting the one or more parameters may include adjusting a viewport, calculating a transformation matrix, and so forth. Adjusting the one or more parameters may cause a position and/or orientation of a virtual camera position associated with the image data to change from one slice 810 to the next slice 810 such that the frame 800 of image data is actually composed of portions of image data corresponding to a plurality of different virtual camera positions/orientations. The sub-frame preparation operations may also include other operations such as generating command buffers, loading shader programs from memory, and the like.

At step 1206, image data for the slice 810 is generated by rendering primitive data associated with a model based on the one or more parameters. A parallel processing unit may be configured to render a plurality of geometric primitives according to a viewport associated with the slice 810. The generated image data is stored in a frame buffer (i.e., a portion of memory configured to store pixel data).

At step 1208, the image data for the slice 810 is presented on the display device 770 of the HMD 750. The image data for the slice 810 may be scanned out from the frame buffer to generate video signals for driving the display device 770. Once the slice 810 has been presented on the display device 770 of the HMD 750, at step 1210, the processor determines whether there are more slices 810 in the frame 800 to be processed. If there are more slices 810 to be processed, then the method returns to step 1202 where the sensor 780 is sampled and steps for processing the next slice 810 are commenced. Steps 1202 through 1208 are repeated until each slice 810 of the frame 800 has been processed and displayed, at which point, at step 1210, the processor terminates the method 1200. The method 1200 may be repeated for additional frames 800.

Figure 13:
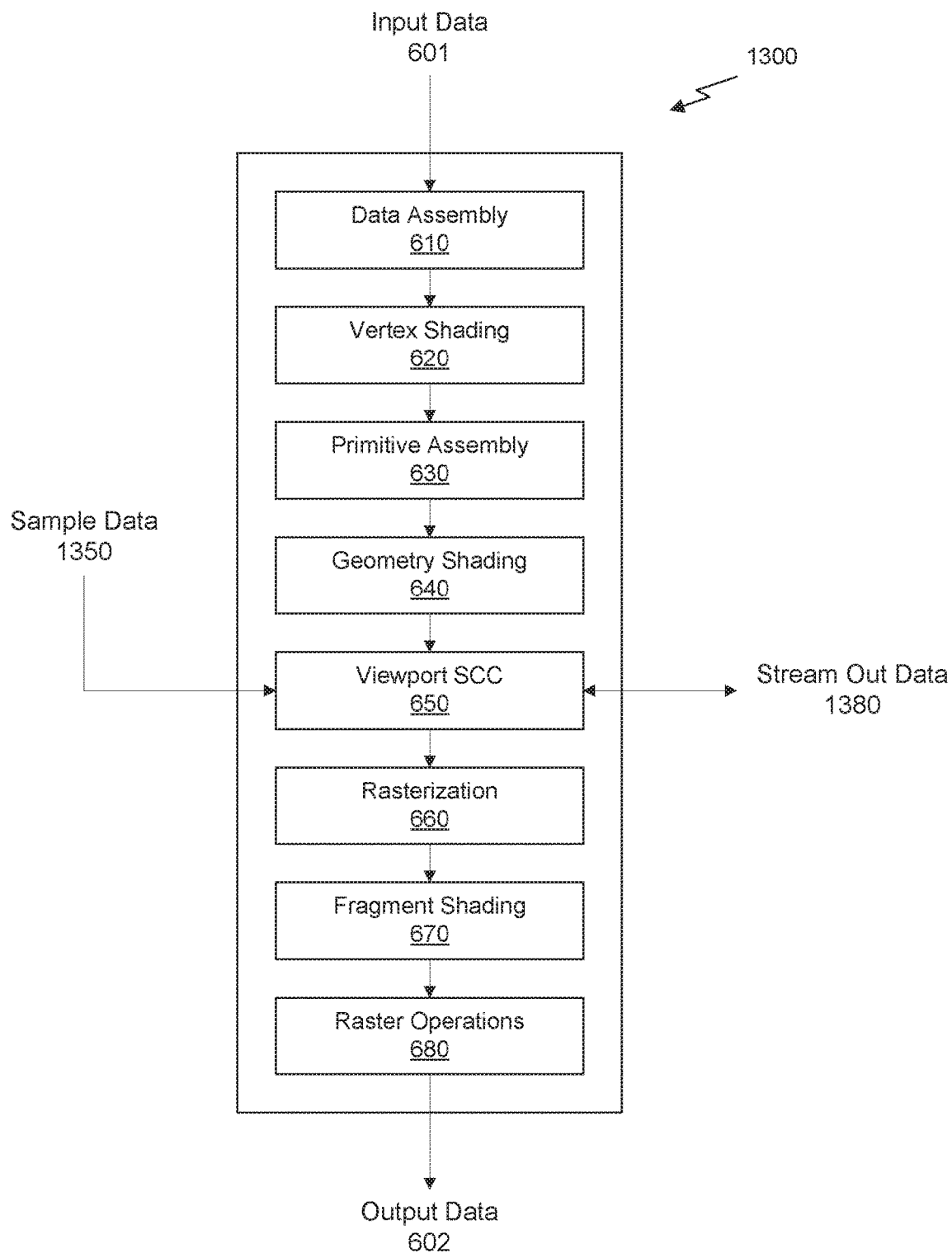
FIG. 13 illustrates a modified graphics processing pipeline, in accordance with one embodiment.

FIG. 13 illustrates a modified graphics processing pipeline 1300, in accordance with one embodiment. In one embodiment, the technique described above may be accomplished by passing the model objects through the graphics processing pipeline 600 multiple times, performing a full pass for each slice 810 of the frame 800. In other words, the model is passed into the top of the graphics processing pipeline 600 for each slice 810 and fully processed to generate image data for the slice 810. The parameters for rendering each slice 810 are passed into the graphics processing pipeline 600 along with the model, at least some of the parameters calculated based on the sample data from the sensor 780. After each slice 810 is processed, the model is passed into the top of the graphics processing pipeline 600 again to render image data for the next slice 810, along with new parameters based on new sample data. While this type of implementation could work, various optimizations may be realized by modifying the graphics processing pipeline.

As shown in FIG. 13, the graphics processing pipeline 600 may be modified to iterate over all slices 810 of a frame 800 in a single pass of the graphics processing pipeline. The Viewport SCC stage 650 may be modified to receive sample data 1350 that represents the position and/or orientation of the HMD 750. In one embodiment, the Viewport SCC stage 650 may access a special register or registers that contain the latest sample data 1350 for rendering each slice 810. The sensor 780 may be configured to write values representing the latest sample data 1350 to the register or registers. In another embodiment, the Viewport SCC stage 650 may include logic for communicating with the sensor 780 via a communications interface such that the Viewport SCC stage 650 may trigger the sensor 780 to collect sample data 1350.

The Viewport SCC stage 650 may also include a stream out function that can stream the transformed vertices received from the geometry shading stage 640 to a buffer 1380 in memory. The Viewport SCC stage 650 may then iteratively read in the buffer of transformed vertices, process the transformed vertices according to the sample data 1350, and pass the processed vertices to the rasterization stage 660 of the graphics processing pipeline 1300.

More specifically, the Viewport SCC stage 650 may be configured to stream out the vertices received from the geometry shading stage to a buffer 1380. The vertices stored in the buffer 1380 represent the transformed vertices of the model as processed by the vertex shader and geometry shader. Such transformations are view independent transformations of the model geometry and, therefore, only need to be performed once per frame 800. In contrast, the Viewport SCC stage 650 may be configured to perform clipping, culling, and early-z operations on the vertices based on the configured viewport and/or viewing frustum, which are view dependent operations. Thus, the Viewport SCC stage 650 may receive sample data 1350 for a particular slice 810 and then read in the vertices in the buffer 1380 to process the vertices according to a viewport configured for a slice 810 based on the position and/or orientation of the HMD 750. After being processed, the vertices are passed onto the rasterization stage 660, which continues rendering the geometric primitives for the slice 810. Once all of the vertices for the buffer have been read in and processed by the Viewport SCC stage 650, the next slice 810 may be processed by receiving new sample data 1350 for the next slice 810 and then re-reading in the vertices in the buffer 1380 to process the vertices according to an adjusted viewport and/or viewing frustum. In other words, the buffer 1380 may be reused for each additional slice 810 in order to avoid the processing associated with the vertex shading stage 620 and the geometry shading stage 640, which speeds up rendering for the slices 810. Consequently, the model data is only passed into the graphics processing pipeline 1300 once per frame 800, but the rasterization and rendering are performed once per slice 810 using the buffer 1380 of transformed vertices.

Figure 14:
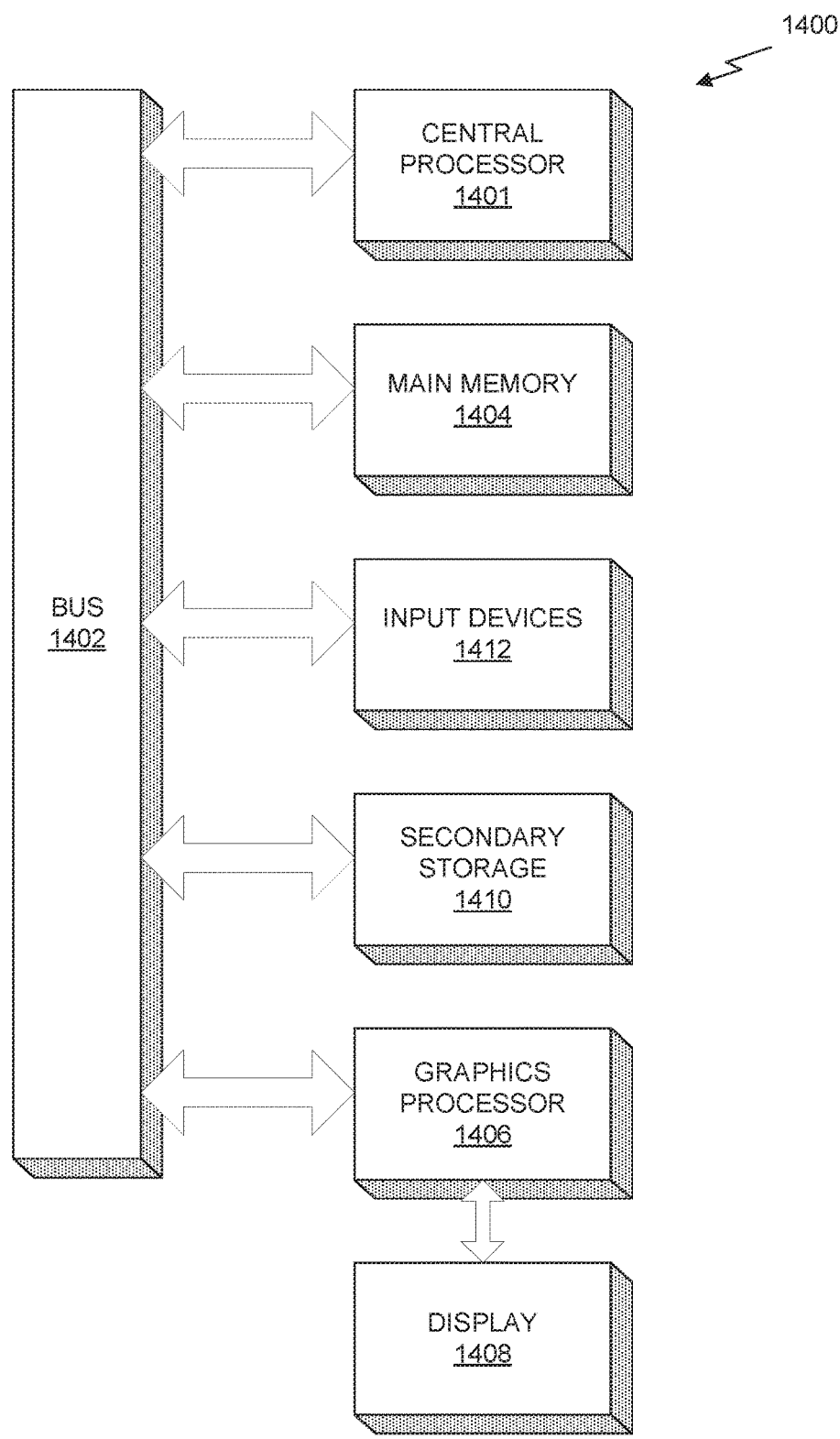
FIG. 14 illustrates an exemplary system in which the various architecture and/or functionality of the various previous embodiments may be implemented.

FIG. 14 illustrates an exemplary system 1400 in which the various architecture and/or functionality of the various previous embodiments may be implemented. As shown, a system 1400 is provided including at least one central processor 1401 that is connected to a communication bus 1402. The communication bus 1402 may be implemented using any suitable protocol, such as PCI (Peripheral Component Interconnect), PCI-Express, AGP (Accelerated Graphics Port), HyperTransport, or any other bus or point-to-point communication protocol(s). The system 1400 also includes a main memory 1404. Control logic (software) and data are stored in the main memory 1404 which may take the form of random access memory (RAM).

The system 1400 also includes input devices 1412, a graphics processor 1406, and a display 1408, i.e. a conventional CRT (cathode ray tube), LCD (liquid crystal display), LED (light emitting diode), plasma display or the like. User input may be received from the input devices 1412, e.g., keyboard, mouse, touchpad, microphone, and the like. In one embodiment, the graphics processor 1406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1400 may also include a secondary storage 1410. The secondary storage 1410 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1404 and/or the secondary storage 1410. Such computer programs, when executed, enable the system 1400 to perform various functions. The memory 1404, the storage 1410, and/or any other storage are possible examples of computer-readable media.

In one embodiment, the architecture and/or functionality of the various previous figures may be implemented in the context of the central processor 1401, the graphics processor 1406, an integrated circuit (not shown) that is capable of at least a portion of the capabilities of both the central processor 1401 and the graphics processor 1406, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1400 may take the form of a desktop computer, laptop computer, server, workstation, game consoles, embedded system, and/or any other type of logic. Still yet, the system 1400 may take the form of various other devices including, but not limited to a personal digital assistant (PDA) device, a mobile phone device, a television, etc.

Further, while not shown, the system 1400 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   dividing a frame into a plurality of slices, wherein each slice is a portion of the frame; and
   for each slice in the plurality of slices:
       sampling a sensor associated with a head mounted display to generate sample data corresponding to the slice,
       adjusting a viewport associated with rendering operations for the slice based on the sample data,
       rendering primitives associated with a model according to the viewport and rendering operations to generate image data for the slice,
   wherein the sampling, adjusting, and rendering is performed for each slice in the plurality of slices based on different sample data from the sensor for each slice in the frame, and the viewport changes for at least one slice of the plurality of slices.

2. The method of claim 1, wherein the sensor comprises a multi-axis accelerometer.

3. The method of claim 1, wherein the sensor comprises one or more of a gyroscope, an accelerometer, and a magnetometer.

4. The method of claim 1, wherein the head mounted display comprises a first LCD display for a left eye of a viewer and a second LCD display for a right eye of a viewer.

5. The method of claim 1, further comprising displaying the image data for each slice on at least one display device in the head mounted display.

6. The method of claim 5, wherein the image data for a first slice is displayed on the at least one display device in the head mounted display substantially simultaneously with rendering the primitive data for a second slice on a graphics processing unit.

7. The method of claim 6, wherein sample data for a third slice is read by a processor substantially simultaneously with rendering the primitive data for the second slice on the graphics processing unit and displaying the image data for the first slice on the at least one display device in the head mounted display.

8. The method of claim 1, wherein the head mounted display includes a system on a chip (SoC) that includes at least one CPU core and a plurality of GPU cores.

9. The method of claim 1, wherein the head mounted display is communicatively coupled to a device that includes a processor and a graphics processing unit, and wherein the image data is rendered on the device and transmitted to the head mounted display via a communications interface.

10. The method of claim 9, wherein the communications interface is a wireless interface.

11. A non-transitory, computer-readable storage medium storing instructions that, when executed by a processor, cause the processor to perform steps comprising:
    dividing a frame into a plurality of slices, wherein each slice is a portion of the frame; and
    for each slice in the plurality of slices:
        sampling a sensor associated with a head mounted display to generate sample data corresponding to the slice,
        adjusting a viewport associated with rendering operations for the slice based on the sample data,
        rendering primitives associated with a model according to the viewport and rendering operations to generate image data for the slice,
    wherein the sampling, adjusting, and rendering is performed for each slice in the plurality of slices based on different sample data from the sensor for each slice in the frame, and the viewport changes for at least one slice of the plurality of slices.

12. The computer-readable storage medium of claim 11, wherein the head mounted display comprises a first LCD display for a left eye of a viewer and a second LCD display for a right eye of a viewer.

13. The computer-readable storage medium of claim 11, further comprising displaying the image data for each slice on at least one display device in the head mounted display.

14. The computer-readable storage medium of claim 13, wherein the image data for a first slice is displayed on the at least one display device in the head mounted display substantially simultaneously with rendering the primitive data for a second slice on a graphics processing unit.

15. The computer-readable storage medium of claim 14, wherein sample data for a third slice is read by a processor substantially simultaneously with rendering the primitive data for the second slice on the graphics processing unit and displaying the image data for the first slice on the at least one display device in the head mounted display.

16. The computer-readable storage medium of claim 11, wherein the head mounted display includes a system on a chip (SoC) that includes at least one CPU core and a plurality of GPU cores.

17. A system, comprising:
    a head mounted display; and
    at least one processor configured to:
        divide a frame into a plurality of slices, wherein each slice is a portion of the frame, and for each slice in the plurality of slices:
sample a sensor associated with the head mounted display to generate sample data corresponding to the slice,
adjust a viewport associated with rendering operations for the slice based on the sample data,
render primitives associated with a model according to the viewport and rendering operations to generate image data for the slice,
wherein the sampling, adjusting, and rendering is performed for each slice in the plurality of slices based on different sample data from the sensor for each slice in the frame, and the viewport changes for at least one slice of the plurality of slices.

18. The system of claim 17, wherein the at least one processor comprises a system on a chip (SoC) that includes at least one CPU core and a plurality of GPU cores, and wherein the at least one CPU core is configured to adjust the viewport associated with rendering operations for the slice and the plurality of GPU cores are configured to render primitive data associated with the model to generate image data for the slice.

19. The system of claim 17, wherein the head mounted display comprises a first LCD display for a left eye of a viewer and a second LCD display for a right eye of a viewer.

20. The system of claim 17, wherein the image data for a first slice is displayed on the head mounted display substantially simultaneously with rendering the primitive data for a second slice.

* * * * *